Figure 3:
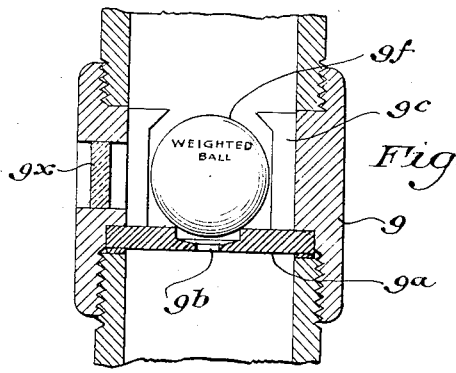

Feb. 14, 1933.  J. W. LEDOUX  1,897,492
FLOW CONTROLLER
Filed Aug. 3, 1927  2 Sheets-Sheet 1

Inventor:
John W. Ledoux,
By [signature]
Attorney.

Feb. 14, 1933. J. W. LEDOUX 1,897,492
FLOW CONTROLLER
Filed Aug. 3, 1927 2 Sheets-Sheet 2

Inventor:
John W. Ledoux,
By [signature]
Attorney.

Patented Feb. 14, 1933

1,897,492

UNITED STATES PATENT OFFICE

JOHN W. LEDOUX, OF SWARTHMORE, PENNSYLVANIA, ASSIGNOR TO SIMPLEX VALVE & METER CO., OF PHILADELPHIA, PENNSYLVANIA, A CORPORATION OF NEW JERSEY

FLOW CONTROLLER

Application filed August 3, 1927. Serial No. 210,274.

My invention is designed to provide improved means for combining with a flowing fluid a second fluid of different specific gravity supplied from a source at or above the level of the flowing fluid at a rate varying with the rate of flow of the flowing fluid, so that the two fluids shall be mixed in the desired ratio regardless of changes in the rate of flow of the flowing fluid. By my improvements an impregnating or coagulating liquid may be fed to a stream of water flowing in a conduit at the desired rate without necessity for positioning the coagulant or sterilizing solution below the conduit, as in my Letters Patent No. 1,085,348 of January 27, 1914, and without danger of impeding the flow of impregnating solution by trapped air or of permitting the escape of the impregnating solution into the conduit when there is no flow therein.

In accordance with the improvements of my present invention, the conduit for the flow of water to be impregnated is provided with a Venturi tube, Pitot tubes, or apertured diaphragm, for effecting a difference in pressure at different zones of the conduit as a result of the flow of liquid therethrough and which are designated in the claims as means for causing differential pressures. Such zones communicate with a closed container for a desired impregnating fluid, which may be either of higher or lower specific gravity than the fluid in the conduit. The zone of the conduit in which lower pressure is caused by flow therethrough is connected with a zone of the container normally having therein the fluid for impregnation, while the zone of the conduit in which higher pressure is caused by the flow therethrough is preferably connected with the container at a point remote from the first named point of connection. Communication is effected through piping preferably provided with means for visually indicating the flow therethrough and for automatically preventing flow when there is no flow in the conduit. Such means when used merely for visually indicating flow may be inserted in either the influx or efflux piping but when used for controlling flow such means are preferably interposed in the efflux piping connecting the container with the zone of lower pressure in the conduit. In its simplest form the indicating and control means comprise check valve mechanism adapted to be displaced and agitated when the head or pressure in the zone of maximum pressure of the conduit exceeds the head or pressure in the container and adapted to be seated when the pressure in the conduit equals or is less than the head at the discharge port of the container. Such check valve mechanism may be operable either by its weight or buoyancy depending upon the direction of the flow to be controlled, and the weight or buoyancy of the check valve is so proportioned as to seat the valve when there is no flow in the conduit and to be readily displaced and agitated by slight pressure thereon. Where more positive control is desirable, this may be effected by a valve or pinch cock positioned by mechanism operable by differential pressure resulting from flow through the conduit. Air valves are provided to avoid trapping air in the pipes or in the container, and prevent siphoning of the impregnating fluid, interruption of the regulated flow thereof, or continuance of flow due to compression of trapped air.

The characteristic features and advantages of my improvements will more fully appear from the following description and the accompanying drawings in illustration thereof.

Figure 4:
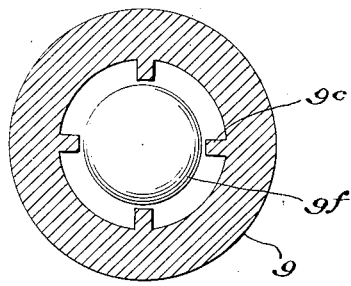
Figure 1:
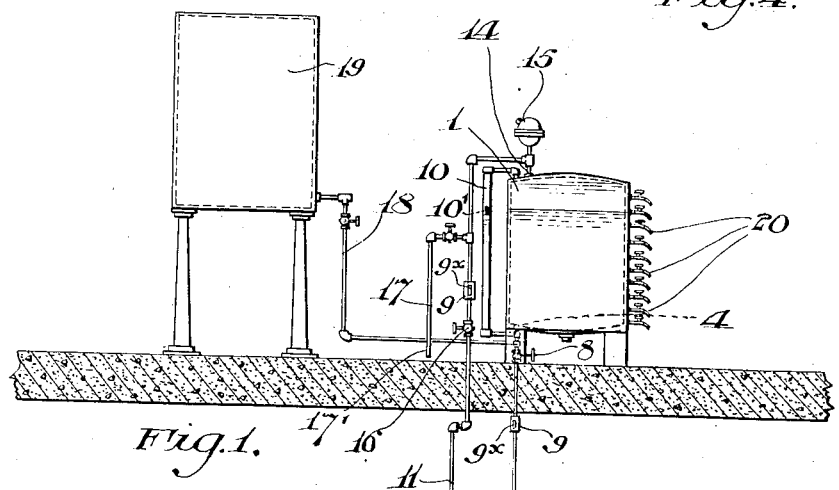
Figure 2:
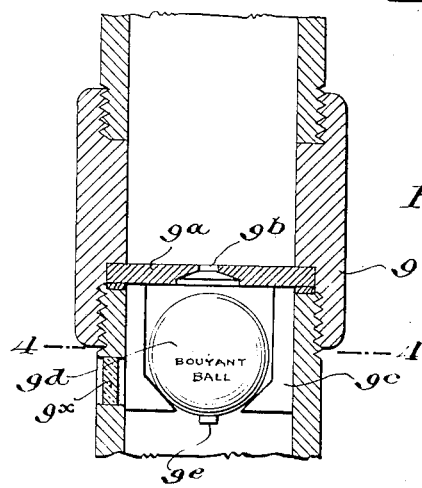
Figure 7:
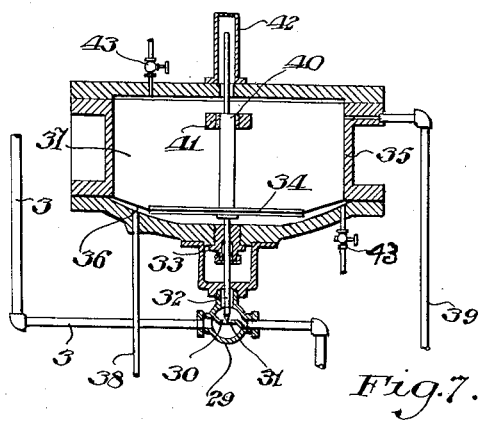
Figure 5:
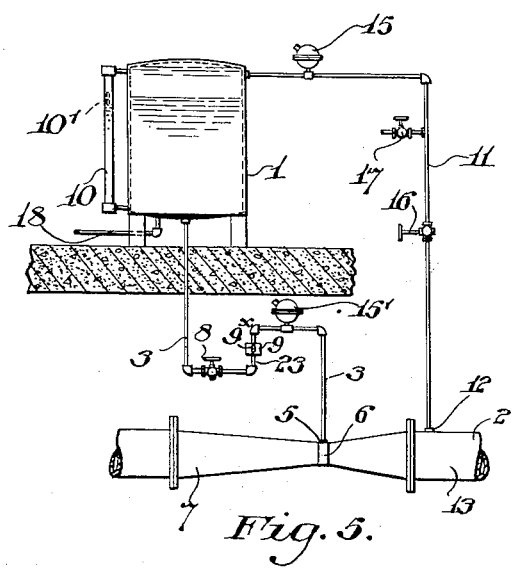
Figure 6:
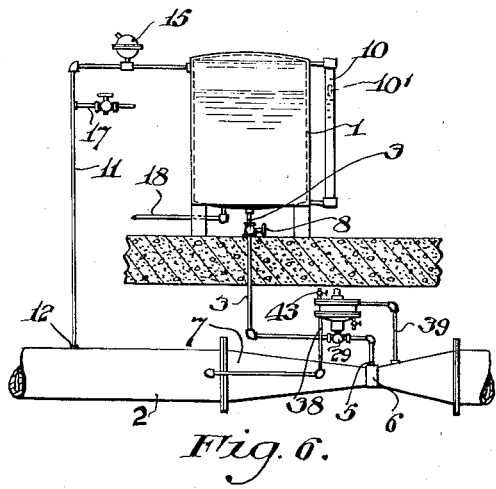
Figure 8:
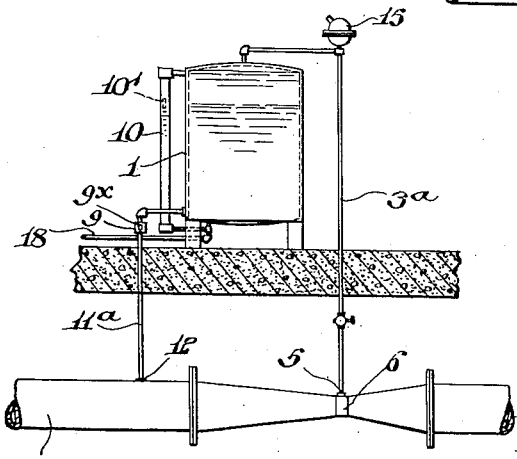

In the drawings, Fig. 1 illustrates somewhat diagrammatically a layout of a preferred embodiment of my invention; Fig. 2 is an enlarged transverse sectional view of a buoyant ball mechanism adapted for use in my improvements for indicating or controlling flow between a source of supply of impregnating fluid and the conduit; Fig. 3 is an enlarged transverse sectional view of a weighted ball mechanism adapted for use in my improvements where the flow to be indicated or controlled is upward through a part of its course, as in Figs. 5 and 8; Fig. 4 is a transverse sectional view on the line 4—4 of either Fig. 2 or Fig. 3; Fig. 5 illustrates, somewhat diagrammatically a modified layout embodying my improvements; Fig. 6 illustrates, also diagrammatically, an embodiment of my invention having a positively operable valve control; Fig. 7 is a fragmentary enlarged sectional view of the valve mechanisms of Fig. 6; and Fig. 8 illustrates, diagrammatically, an embodiment of my invention particularly adapted for supplying an impregnating fluid of lower specific gravity than the fluid in the conduit.

As illustrated in Figs. 1, 2, 3 and 4 of the drawings, a source of supply, such as the normally closed container or tank 1, for an impregnating fluid of higher specific gravity than the flow to be impregnated, is mounted at or above the level of the conduit 2 and connected therewith by a pipe 3 having its port 4 communicating with the lower part of the tank and its port 5 connected with the constricted throat 6 of a Venturi section 7 of the conduit.

The flow through the pipe 3 may be controlled by a manually operable valve 8 and may be indicated and controlled by an automatically operable device 9 preferably comprising an orifice plate $9a$ inserted between coupled sections of the pipe 3 and containing an aperture $9b$ adapted to be controlled by a ball check housed within a cage $9c$ comprising ribs spaced peripherally around one of the pipe sections and having a sight glass $9x$ in the peripheral wall thereof. When the flow to be controlled is downward, as in the layout illustrated in Fig. 1, there is used a ball $9d$ of buoyant material which is positioned below the orifice $9b$, and preferably weighted as at $9e$ so as to register with such orifice when the ball rises against the plate $9a$. The buoyancy of the ball $9d$ normally tends to raise it against the plate $9a$ and close the orifice $9b$, but the ball may be unseated to open the orifice by slight pressure thereon from above in excess of the pressure from below, and when unseated is caused to constantly move by the flowing fluid.

A pipe 11 has an inlet port 12 connected with a conduit section 13 of larger cross sectional area than the throat 6 and discharging through a port 14 into the upper zone of the tank 1 above the normal maximum level of impregnating fluid therein. An air release valve 15, preferably of the automatic type, vents air from the tank and piping so as to prevent accumulation and compression of air therein which might otherwise tend to unseat the valve ball $9d$.

The buoyancy of the ball $9d$ is so proportioned to the specific gravity of the impregnating solution that, when there is no air pressure in the system and the liquid pressures at the ports 5 and 12 are equal, the ball $9d$ closes the port $9b$. When, however, liquid flows through the conduit 2, a higher pressure is caused at the port 12 than at the port 5, and such unbalanced pressure causes a flow through the pipe 11 into the top of the tank 1 and from the lower portion of the tank 1 through the pipe 3 into the throat 6, the pressure being sufficient to unseat the ball and the flow being approximately proportional to the square root of the difference in pressure. The flow of liquid through the conduit 2 is also approximately proportionate to the square root of the difference in pressure at the ports 12 and 5, and hence the flow through the pipe 3 will bear a constant ratio to the flow of water through the conduit 2. When flow in the conduit ceases, the pressures at the ports 12 and 5 again balance and, since any air in the system is emitted through the valve 15, the buoyancy of the ball $9d$ causes it to rise and close the orifice $9b$ and further flow of impregnating fluid is prevented until there is again flow in the conduit 2.

The aperture $9b$ in the plate $9a$ is made of such size as to pass the desired quantity of solution, and the ribs $9c$ insure sufficient clearance around the ball $9d$ to pass an amount of fluid greater than the capacity of the orifice.

Should the apparatus be connected with a system having a constant flow through the conduit 2 or should the ball $9d$ be so located that it is not readily visible, the pipe 11 may have inserted therein at a convenient point for observation a caged ball device arranged as shown in Fig. 3 with a weighted ball $9f$ above the orifice $9b$ of the plate $9a$, caged by the ribs $9c$ and visible through the sight aperture $9x$. The fluid jetted through the orifice $9b$ lifts and agitates the ball so long as there is flow to indicate that the feeding mechanism is operating properly.

For convenience in emptying the automatic feeding tank 1 of liquid supplied from the pipe 11 and recharging the tank with impregnating or coagulating solution, the pipe 11 is provided with a control valve 16 and a valve controlled waste branch 17. A valved supply pipe 18 is connected with the lower part of the tank 1 through the pipe 3. The connection between the pipes 3 and 18 is made above the valve 8. The solution is supplied to the pipe 18 from an open mixing tank 19. To empty the tank 1 of water and fill it with hypochloride or other suitable solution, the valves 8 and 16 are closed, the valves of the pipes 17 and 18 are opened and solution allowed to flow from tank 19 into tank 1 to a desired level. The level of solution in the tank 1 is readily determinable by the position of a float 10' in a gage glass 10 communicating with the top and bottom of the tank. Test cocks 20 provide means for ascertaining the quality of solution in the tank 1 and provide supplementary means for testing the level thereof.

By inserting an upcast 23 in the pipe 3 as indicated in Fig. 5, a weighted ball check such as shown in Fig. 3 may be employed for both controlling and indicating the flow of solution or coagulant from the tank 1. The solution or coagulant has greater specific gravity than the liquid flowing through the conduit 2 and the ball 9f is made of sufficient weight to resist the pressure of the coagulant solution alone but to be readily unseated when flow through the conduit 2 creates unbalanced pressures at the ports 5 and 12. Any air trapped in the upcast is vented through the valve 15'.

Figs. 6 and 7 illustrate an embodiment of my invention having the flow through the discharge pipe 3 controlled by a valve 29 containing a diaphragm 30 with a port 31 therein. A valve stem 32 is adapted to open or close the port 31 and is movable in the packing nut 33 by a flexible diaphragm 34 mounted in a casing 35 and forming therein compartments 36 and 37. The compartment 36 is connected by the pipe 38 with a normal section of the conduit 2 and the compartment 37 is connected by a pipe 39 with the throat of the Venturi section of the conduit. A rod 40, connected with the top of the diaphragm, is movable through the bearing 41 and has an extension visible through the sight glass 42. Valves 43 permit the emission of air from the respective compartments 36 and 37.

The weight of the members 32, 34 and 40 causes the valve stem 32 to normally close the port 31 when there is no flow in the conduit 2. When liquid flows through the conduit 2, the pressure transmitted to the diaphragm 34 through the pipe 38 exceeds the pressure transmitted to the diaphragm through the pipe 39 and the stem 32 is lifted by the diaphragm.

Differential pressures are then transmitted to the tank 1 through the pipes 11 and 3 to cause a desired proportional flow of coagulant from the tank to the conduit 2.

In Fig. 8, I have illustrated means for feeding an impregnating fluid of lower specific gravity than fluid in the conduit 2, and such for instance as oil, from a source of supply above the conduit at a regulated rate to fluid flowing in the conduit. In such construction, a pipe 11a connects the large section of the conduit 2 with the bottom of the tank 1, and if desired, check valve mechanism 9 shown in detail in Fig. 3 may be incorporated in the pipe 11a to indicate flow and prevent any reverse flow. The impregnating fluid floats at the top of the tank above the water admitted through the pipe 11a and is discharged through the valved pipe 3 into the constricted neck 6 of the conduit when there is flow of fluid in the conduit 2. Any air collecting in the system is emitted through the valve 15.

In this construction, the differences in pressure resulting from flow through the conduit causes a flow from the conduit through the pipe 11a into the bottom of the tank 1 and from the top of the tank 1 through the pipe 3 into the throat 6. When flow through the conduit ceases, flow from the tank also ceases since the air which might otherwise cause siphoning has been vented through the valve 15.

It will be understood that the structures shown in Figs. 5, 6 and 8 may be connected with a mixing tank and provided with hand valves, supplementary check valve mechanisms, and test cocks, such as shown in Fig. 1 if desired.

In all forms of my apparatus there is provided a by-pass from a region of high pressure to a region of low pressure of a conduit, such by-pass having therein, at or above the conduit level, a source of supply for impregnating fluid, and air venting mechanisms. When the impregnating fluid is of greater specific gravity than the fluid in the conduit, the by-pass is also provided with valve mechanism permitting flow through the by-pass only in one direction from the zone of normally higher pressure in the conduit to the zone of normal lower pressure therein.

Having described my invention, I claim:

1. The combination with a conduit having means for causing differential pressures by the flow of fluid therethrough, of a fluid container, means comprising pipes having ports communicating with said differential pressure means and with said container, and means preventing flow through said pipe last named when there is no flow in said conduit and comprising fluid immersed member and a seat therefor, said member having a specific gravity so proportioned to the specific gravity of its immersing fluid as to be seated on said seat when said immersing fluid is at rest and to be unseated by movement of said fluid.

2. The combination with a container and a conduit having means for causing differential pressures therein, of pipes connecting said container and conduit, one of said pipes having a transparent section and containing a ball constantly moving with flow through said pipe and visible through said section.

In testimony whereof I have hereunto set my name this 30th day of July, 1927.

JOHN W. LEDOUX.